United States Patent [19]

Yeung et al.

[11] Patent Number: 5,524,608
[45] Date of Patent: Jun. 11, 1996

[54] COOKING KETTLE

[75] Inventors: Wing Y. Yeung, Richmond Hill; Gordon P. Mabee, Orillia; George Seeman, Concord, all of Canada

[73] Assignee: Cleveland Range Ltd., Concord, Canada

[21] Appl. No.: 329,114

[22] Filed: Oct. 25, 1994

[51] Int. Cl.⁶ ..................................................... A47J 27/00
[52] U.S. Cl. .......................... 126/391; 126/390; 126/392; 126/360 A
[58] Field of Search .................................. 126/391, 392, 126/390, 360 R, 360 A

[56] References Cited

U.S. PATENT DOCUMENTS

| | | | |
|---|---|---|---|
| 651,952 | 6/1900 | Pearlstine | 126/265 |
| 915,715 | 3/1909 | Kolsky | 126/266 |
| 5,337,728 | 8/1994 | Maruyama | 126/390 |
| 5,373,836 | 12/1994 | Mifune et al. | 126/390 |

*Primary Examiner*—Larry Jones
*Attorney, Agent, or Firm*—Bereskin & Parr

[57] ABSTRACT

A steam-jacketed kettle for cooking food includes a combustion chamber below the steam jacket. The combustion chamber is provided with an atmospheric gas burner for heating water in the steam jacket. The burner is disposed in an offset location at one side of the combustion chamber and a series of flue gas outlets are provided at the opposite side of the combustion chamber so that combustion gases tend to wash across the bottom wall of the steam jacket, for even heating. The flue gas outlets communicate with respective flue pipes that extend back through the steam jacket to a common flue gas collector, so that additional heat can be transferred from the gases in the flue pipes to the steam jacket.

10 Claims, 4 Drawing Sheets

COOKING KETTLE

FIELD OF THE INVENTION

This invention relates to kettles for cooking and heating food and is concerned more particularly with a kettle of the type which is heated by a steam jacket.

Steam jacketed cooking kettles are generally used for cooking and heating relatively large quantities of food, for example in hotels, restaurants and the like. Typically, the kettle includes a stainless steel cooking vessel which may have a capacity in the range of 40 to 100 gallons. The vessel is at least partially surrounded by a steam jacket, by which the vessel, and hence the food in the vessel are heated. The vessel may be mounted in a supporting frame, so that it can be tilted for pouring of food from the kettle.

The steam jacket may be supplied with steam from a remote boiler, or the kettle may essentially incorporate its own self-contained boiler. For example, the steam jacket itself may be a sealed enclosure containing water, and provision may be made to supply heat from below to cause water in the jacket to evaporate and form steam. The steam will condense on the outer surface of the vessel containing the food, and will give up its latent heat of vaporization, thereby heating the vessel to the temperature of the boiling water at the pressure that exists within the jacket.

In one type of prior art kettle, the steam jacket has a flat bottom wall which is heated directly by a series of radiant burners spaced across the wall.

SUMMARY OF THE INVENTION

An object of the present invention is to provide an improved steam-jacketed kettle of the type in which the steam is generated within the jacket.

The kettle provided by the invention includes a vessel for receiving food to be cooked and a steam jacket which at least partially surrounds the vessel. The jacket is defined by a shell which is spaced outwardly from the vessel and which defines a bottom wall of the vessel. A combustion chamber below the bottom wall has at least one atmospheric burner located offset from a vertical axis of the combustion chamber and arranged to heat the bottom wall of the steam jacket. The combustion chamber also has air inlet means and flue gas outlet means. The flue gas outlet means extends through the bottom wall of the steam jacket at a location offset from the vertical axis of the combustion chamber opposite the burner, so that combustion gases from the burner tend to flow across the said bottom wall to the flue gas outlet means and give up heat to the vapour jacket. At least one flue pipe extends from the flue gas outlet means through the vapour jacket to exhaust for further heat transfer to the vapour jacket.

It has been found in practice that, by arranging the burner essentially at one side of the combustion chamber and the flue gas outlet means at the opposite side, the hot flue gases from the burner tend to "wash" across the bottom wall of the vapour jacket for even and efficient heating of the steam jacket. The flue gases from the burner travelling through the flue pipe or pipes then give up additional heat to the vapour jacket. Overall, this makes for high efficiency of energy transfer from the burner fuel (e.g. gas) to the steam jacket.

While more than one burner may be provided, at least for small table-top size kettles, a single burner can be sufficient. There is no need to provide an array of individual burners to evenly heat the vapour jacket as has been the case in the prior art.

Typically, the burner will be a linear gas burner, for example of the type known as a "Bray Burner". The combustion chamber will usually be cylindrical and the burner may then be arranged essentially in a "chordal" position approximately mid-way between the vertical axis of the combustion chamber and its sidewall. The flue gas outlet means can then be arranged diametrally opposite to the burner. The flue gas outlet means may comprise a series of flue gas openings, each coupled with a flue pipe that passes through the steam jacket. For example, the flue gas openings may be arranged in an arcuate configuration corresponding to the arcuate shape of the sidewall of the combustion chamber.

Preferably, the bottom wall of the steam jacket slopes upwardly towards the flue gas outlet means and the or each flue pipe itself slopes upwardly in the direction of gas flow, both so as to ensure smooth gas flow. The flue pipe or pipes may be directed generally oppositely to the direction of gas flow from the burner to the flue gas outlet means (i.e. so that gas in the tubes flows back in a direction towards the burner). An upright flue collector or manifold may be provided at an appropriate location externally of the steam jacket to receive gases from the flue pipe or pipes.

BRIEF DESCRIPTION OF DRAWINGS

In order that the invention may be more clearly understood, reference will now be made to the accompanying drawings which illustrate a particular preferred embodiment of the invention by way of example, and in which.

DESCRIPTION OF PREFERRED EMBODIMENT

Figure 1:
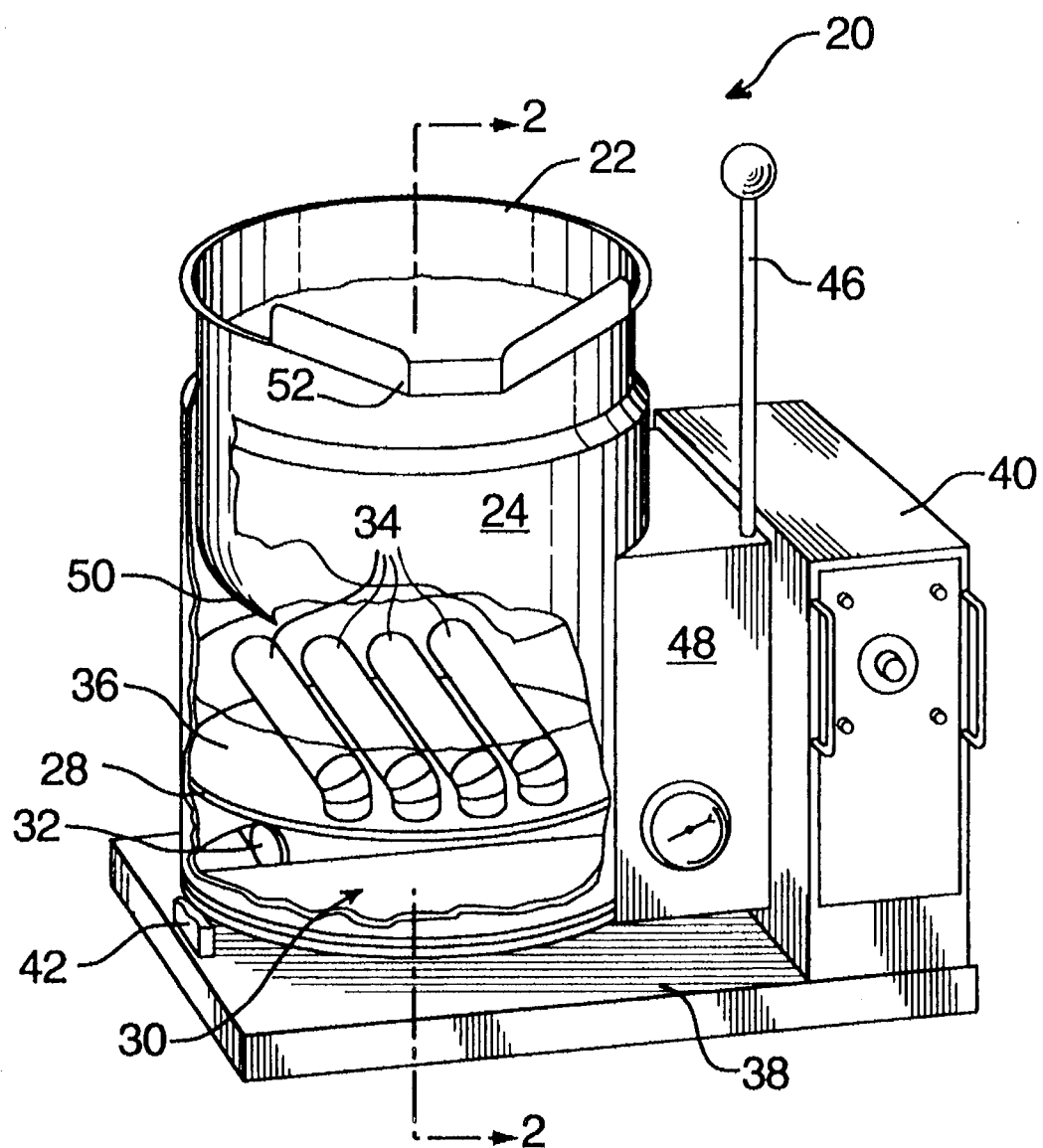
FIG. 1 is a front perspective view of a tilting table-top gas kettle in accordance with a preferred embodiment of the invention.

Referring first to FIG. 1, a tilting table-top gas kettle in accordance with the invention is generally denoted by reference numeral 20. The kettle includes a vessel 22 for receiving food to be heated or cooked, and a steam jacket 24 for heating the vessel. The vessel and steam jacket will be described in more detail later, primarily with reference to FIG. 2.

In the meantime, it will be noted that parts of the steam jacket and vessel have been broken away in FIG. 1 to show internal structure. In particular, it can be seen that the steam jacket 24 has a bottom wall 28 and that a combustion chamber 30 is provided below the steam jacket for heating the jacket via its bottom wall 28. An atmospheric burner 32 is partly visible within the combustion chamber 30. Also visible are a series of flue pipes 34 which extend through the steam jacket for conveying to exhaust combustion gases produced by the burner 32. The flue pipes 34 are seen extending through a body of water 36 which is sealed within the steam jacket. When the kettle is in use, heat from the burner generates steam from the body of water 36 and the steam continuously condenses on the external surface of the vessel and returns to the body of water.

Figure 3:
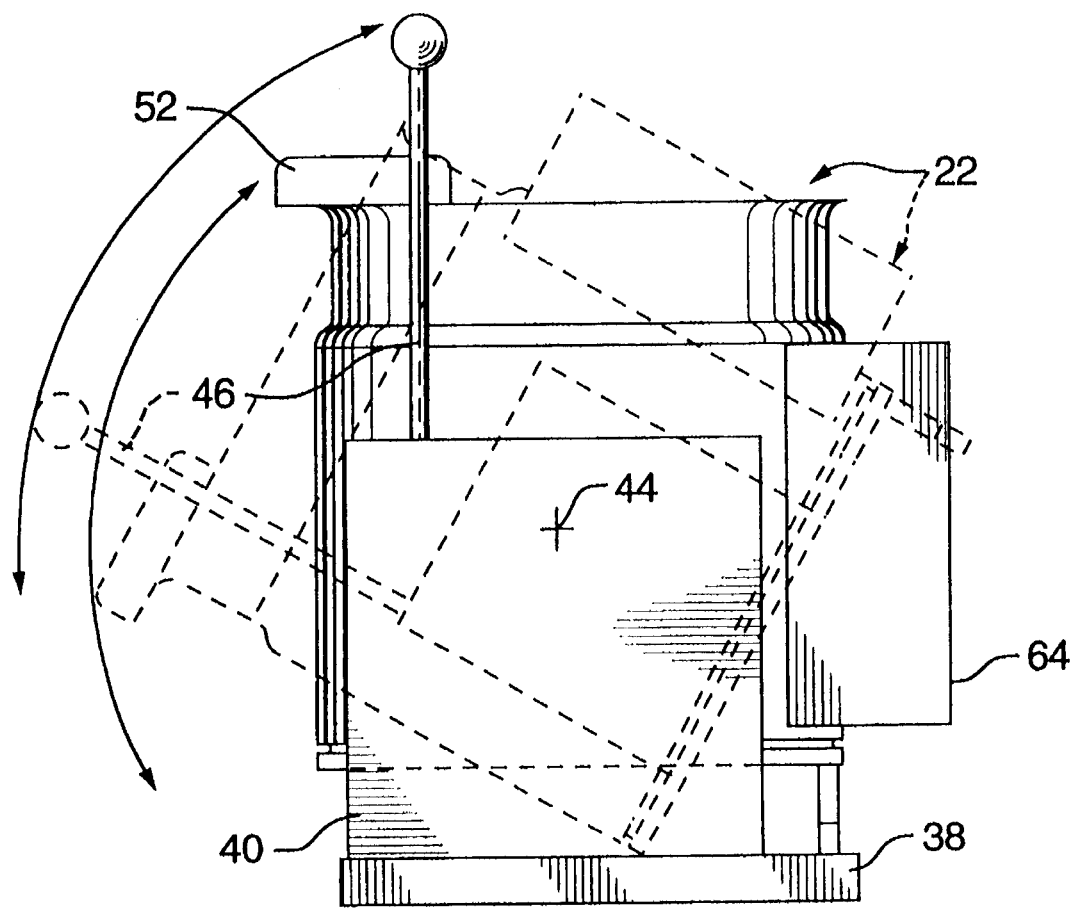
FIG. 3 is a side elevational view from the right in FIG. 1, illustrating tilting of the kettle; and, FIG. 4 is a sectional plan view on line 4—4 in FIG. 2, showing the arrangement of flue pipes in relation to the bottom plate of the vapour jacket of the kettle.

As mentioned previously, the kettle of this particular embodiment is a tilting kettle; in other words, the cooking vessel 22 can be tilted to pour out food after it has been cooked or heated. In FIG. 3, the kettle is shown in full lines in its normal upright position and in dotted lines in a partially tilted position.

Reverting to FIG. 1, it will be seen that the kettle includes a fixed rectangular base plate 38 provided with an upright rectangular housing 40 at one end. The cooking vessel is supported for tilting on trunnions (not shown) between the housing 40 and an upright bracket at the opposite end of the base plate 38. Part of the bracket is indicated at 42 but the remainder has been omitted since the particular arrangement used to tiltably support the cooking vessel is not part of the present invention and is already found on existing tilting kettles. For present purposes, it is sufficient to note that the trunnions supporting the cooking vessel provide a tilt axis which is indicated at 44 in FIG. 3. An upright handle 46 is provided for manually tilting the cooking vessel about axis 44. As best seen in FIG. 1, the handle 46 extends upwardly from a sub-housing 48 secured to the side of the cooking vessel 22 nearest the fixed housing 40. Within the two housings are appropriate control and monitoring equipment, as well as gas supply means for the burner 32. Again, these parts of the kettle do not relate to the present invention and are found on existing kettles. For these reasons, they have not been described in detail.

Figure 2:
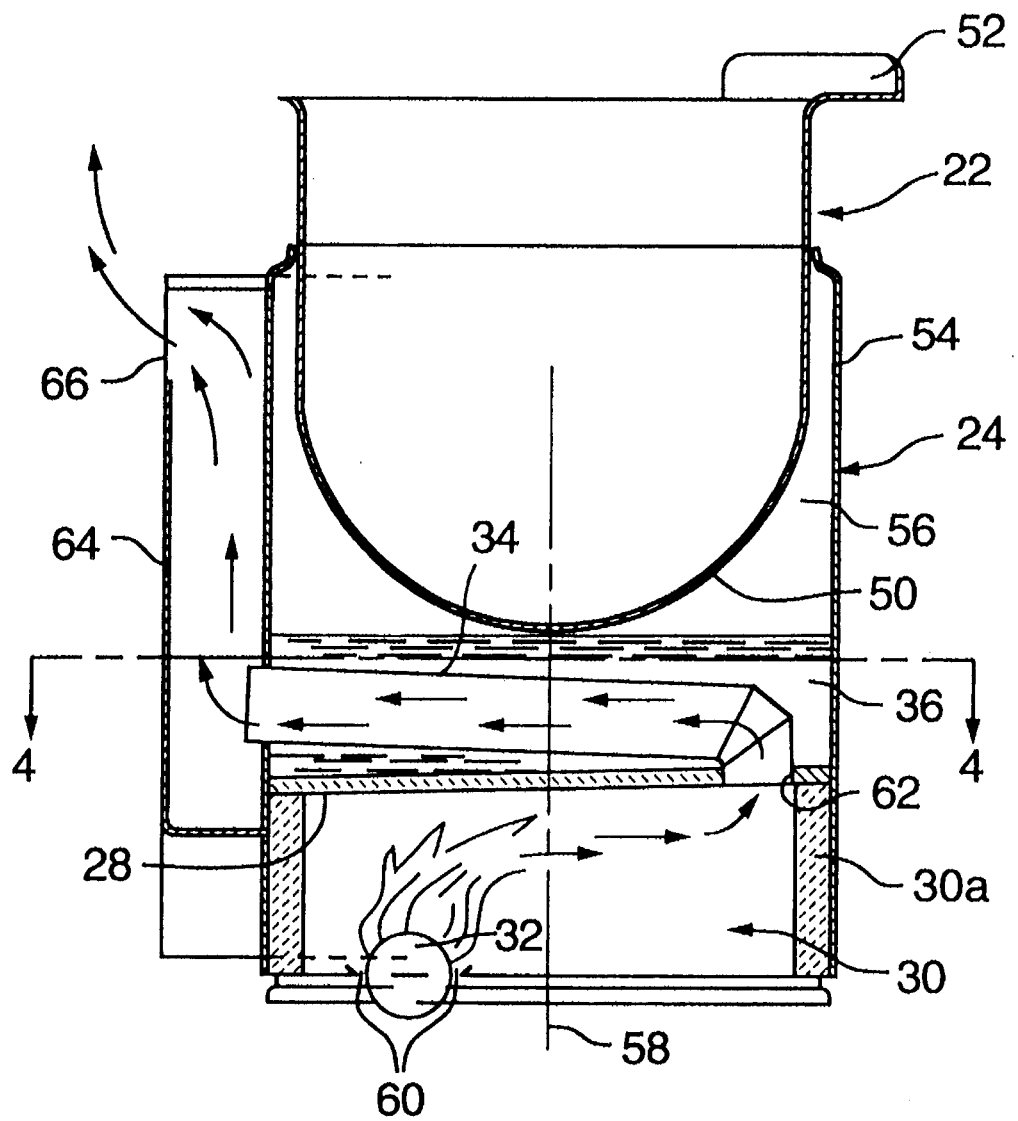
FIG. 2 is a vertical sectional view generally in the plane denoted 2—2 in FIG. 1.

Referring now to FIG. 2, it will be seen that the cooking vessel 22 has a generally cylindrical configuration in its upper region, and a hemispherical bottom indicated at 50. A pouring lip 52 is provided at the rim of the vessel. Typically, the vessel is fabricated in stainless steel.

The steam jacket 24 is defined by a cylindrical shell 54 which surrounds the vessel over a substantial portion of its height and which is spaced outwardly from the vessel to define an enclosure 56 in which the steam is generated. Again, the shell 54 is stainless steel and is welded to the cooking vessel 22. The bottom wall 28 of the steam jacket is provided by a mild steel plate that is also welded to the shell. Accordingly, the steam enclosure 56 is sealed.

In this particular embodiment, the design of the kettle is such that the shell 54 extends below plate 28 and in effect also defines the sidewall of the combustion chamber 30. In other words plate 28 forms a partition in the cylindrical shell and defines the bottom of the steam jacket and the top of the combustion chamber. Shell 54 extends about an axis 58 which defines a vertical axis of the combustion chamber (and of the cooking vessel). Insulation in the combustion chamber sidewall is indicated at 30a.

It will be seen from FIG. 2 that the atmospheric burner 32 is positioned in the combustion chamber 30 offset from axis 58. In this particular embodiment, the burner has a cylindrical overall configuration which is indicated in ghost outline in FIG. 4 at 32. It will be seen from FIG. 4 that the burner is located generally on a chord of the circle that represents the combustion chamber as seen in plan. In other words, the burner extends generally parallel to a vertical median plane of the combustion chamber as indicated at "P" in FIG. 4. Burner 32 is a conventional "Bray Burner".

Referring back to FIG. 2, the combustion chamber 30 is provided with combustion air inlets in the form of elongate slots 60 along respectively opposite sides of the burner. These slots allow combustion air to enter the combustion chamber 30 on opposite sides of the burner, from the area below the bottom of the cooking vessel (and above the base plate 38).

The combustion chamber is also provided with flue gas outlet means in the form of openings through the plate 28 that forms the bottom wall of the steam jacket. One of those openings is visible at 62 in FIG. 2. It will be seen that the opening is offset from the vertical axis 58 of the combustion chamber opposite the burner, so that combustion gases from the burner tend to flow across and give up heat to the plate 28 in passing to the flue gas outlet means 62. The arrows in FIG. 2 designate the path of the combustion gases. The gases essentially "wash" across the plate 28 so that the plate (and hence the steam jacket) is heated uniformly. Plate 28 is arranged to slope slightly upwardly towards the flue gas outlet means 62 (i.e. from left to right in FIG. 2) so as to promote smooth flow of combustion gases to the flue gas outlet means.

Figure 4:
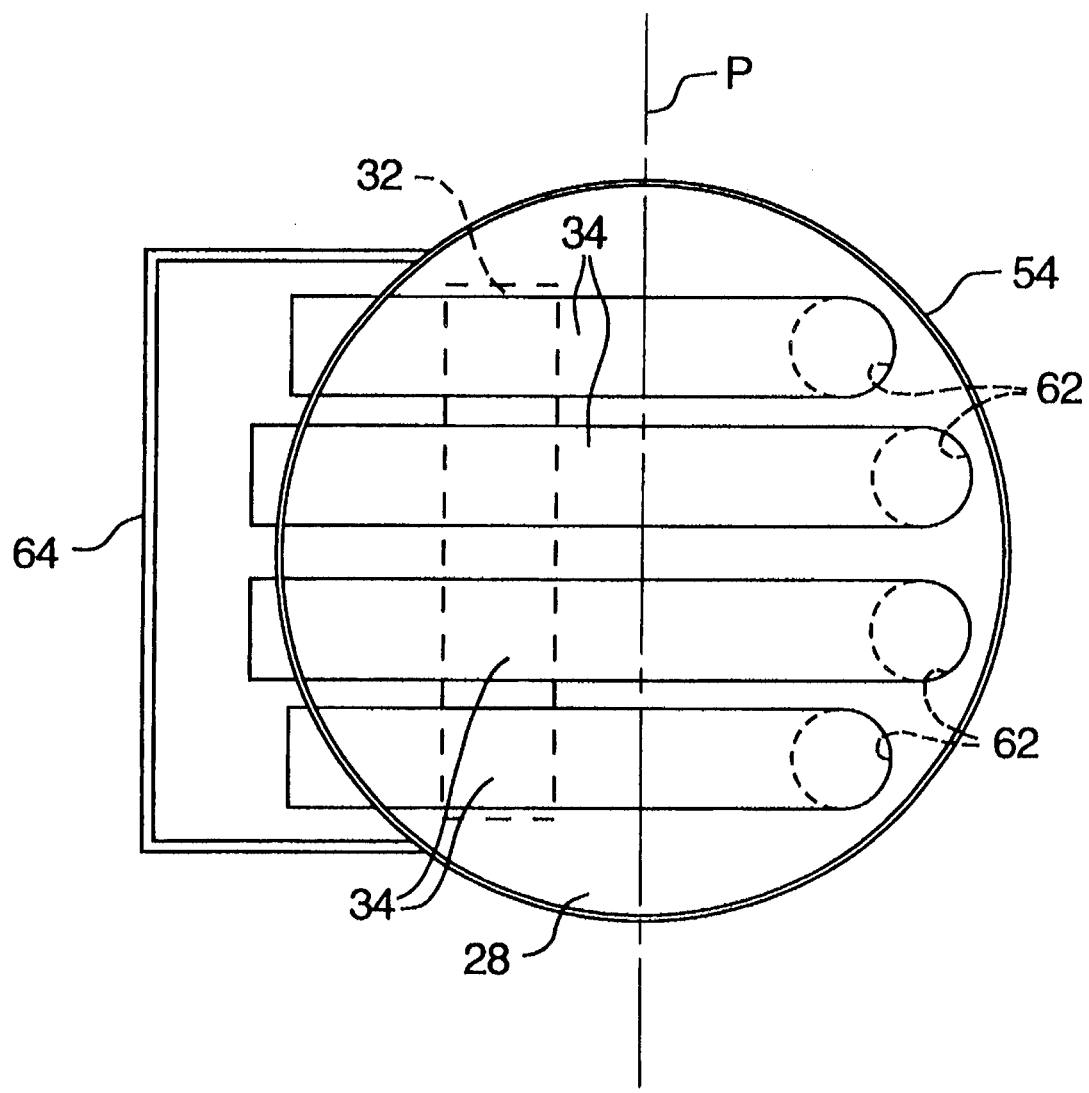

FIG. 4 shows that, in this embodiment, there are in fact four openings 62 through plate 28 and that the openings are arranged in an arcuate configuration that matches the curvature of the sidewall of the combustion chamber, on the opposite side of plane P to the burner 32. Each of the openings communicates with one of the series of flue pipes 34 referred to previously in connection with FIG. 1. Each of the flue pipes extends from the relevant opening through the vapour jacket to exhaust, for further heat transfer from the flue gas to the vapour jacket. In this embodiment, the flue pipes 34 open into an upright flue gas collector or manifold 64 at the back of the kettle. Manifold 64 is simply an enclosure in which the gases are collected and which includes an exhaust 66 at the top. The flue pipes 34 slope upwardly slightly towards the manifold, again for improved gas flow. The number of flue pipes 34 (and hence openings 62) may of course vary, for example depending on the capacity of the kettle.

The described arrangement in which the burner 32 and flue gas outlet means 62 are arranged on opposite sides of the vertical axis of the combustion chamber has been found to make for uniform and efficient heating of the bottom wall of the water jacket, and hence good heat transfer to the water within the jacket. At the same time, by routing the flue gases through the body of water within the jacket, further heat transfer can take place from the flue gases to the water.

It should of course be understood that the preceding description relates to a particular preferred embodiment of the invention only and that many modifications are possible within the broad scope of the invention. For example, while the invention has been described in the context of a tilting kettle, it could also be used in a fixed kettle. Also, the burner for the kettle could be oil fired instead of gas fired. While the cooking vessel itself (and consequently also the combustion chamber) will normally be of cylindrical shape, this is not essential. References to the "vertical axis" of the combustion chamber could also apply to a rectangular or other shaped chamber.

We claim:

1. A cooking kettle, comprising:

a vessel for receiving food to be cooked;

a steam jacket for heating the vessel, the steam jacket being defined by a shell which at least partially surrounds and is spaced outwardly from the vessel, the steam jacket having a bottom wall defined by the shell;

a combustion chamber below said bottom wall of the steam jacket;

at least one atmospheric burner in the combustion chamber for heating the steam jacket via its said bottom wall, the combustion chamber extending about a vertical axis and the burner being positioned in the combustion chamber offset from that axis;

combustion air inlet means and flue gas outlet means in the combustion chamber, the flue gas outlet means extending through the steam jacket bottom wall at a location offset from the said vertical axis opposite the burner, so that combustion gases from the burner tend to flow across and give up heat to said wall in passing to the flue gas outlet means; and, at least one flue pipe extending from the flue gas outlet means through the vapour jacket to exhaust, for further heat transfer from the flue gas to the vapour jacket.

2. A kettle as claimed in claim 1, wherein said at least one atmospheric burner is a single linear gas burner arranged in a bottom wall of the combustion chamber, and wherein said combustion air inlet means comprises air inlet slots on opposite sides of said burner, in said combustion chamber bottom wall.

3. A kettle as claimed in claim 2, wherein said combustion chamber is cylindrical and wherein the burner is arranged in a chordal position considering the combustion chamber as seen in plan, with said flue gas outlet means in a generally diametrally opposed position with respect to said vertical axis of the combustion chamber.

4. A kettle as claimed in claim 3, wherein said flue gas outlet means comprises a series of flue gas openings in said bottom wall of the steam jacket, each said opening communicating with one said flue pipe extending through the vapour jacket to exhaust.

5. A kettle as claimed in claim 4, wherein said flue gas openings are arranged in an arcuate configuration corresponding to the shape of the combustion chamber as seen in plan.

6. A kettle as claimed in claim 1, wherein said steam jacket bottom wall slopes upwardly in the direction of flue gas flow from said burner to said flue gas outlet means.

7. A kettle as claimed in claim 6, wherein said at least one flue pipe slopes upwardly in the direction of flue gas flow along said pipe.

8. A kettle as claimed in claim 1, in which the vessel is adapted to be tilted for pouring of food from the vessel.

9. A kettle as claimed in claim 3, wherein said steam jacket shell is of cylindrical form and comprises an upper part which at least partially surrounds the vessel, and a lower part which defines the combustion chamber, and wherein the shell is provided internally with a transverse plate which forms said steam jacket bottom wall.

10. A cooking kettle, comprising:

a vessel for receiving food to be cooked;

a steam jacket for heating the vessel, the steam jacket being defined by a shell which at least partially surrounds and is spaced outwardly from the vessel, the steam jacket having a bottom wall defined by the shell;

a combustion chamber below said bottom wall of the steam jacket;

at least one atmospheric burner in the combustion chamber for heating the steam jacket via its said bottom wall, the combustion chamber extending about a vertical axis and the burner being positioned in the combustion chamber offset from that axis;

combustion air inlet means and flue gas outlet means in the combustion chamber, the flue gas outlet means extending through the steam jacket bottom wall at a location offset from the said vertical axis opposite the burner, so that combustion gases from the burner tend to flow across and give up heat to said wall in passing to the flue gas outlet means;

a series of flue pipes extending from the flue gas outlet means through the vapour jacket to exhaust, for further heat transfer from the flue gas to the vapour jacket;

wherein said at least one atmospheric burner is a single linear gas burner arranged in a bottom wall of the combustion chamber, and wherein said combustion air inlet means comprises air inlet slots on opposite sides of said burner, in said combustion chamber bottom wall;

wherein said combustion chamber is cylindrical and wherein the burner is arranged in a chordal position considering the combustion chamber as seen in plan, with said flue gas outlet means in a generally diametrally opposed position with respect to said vertical axis of the combustion chamber;

wherein said flue gas outlet means comprises a series of flue gas openings in said bottom wall of the steam jacket, each said opening communicating with one said flue pipe extending through the vapour jacket to exhaust;

wherein said flue gas openings are arranged in an arcuate configuration corresponding to the shape of the combustion chamber as seen in plan;

and a flue gas collector arranged in an upright orientation at a side of said vessel, wherein each said flue pipe extends from the relevant flue gas opening to the collector so that the flue gas passing through the flue pipes enters the collector, and wherein the collector has an exhaust opening adjacent an upper end thereof.

* * * * *